United States Patent [19]
Guillemet

[11] Patent Number: 5,890,289
[45] Date of Patent: *Apr. 6, 1999

[54] METHOD OF MAKING AN INSULATING SPACER FOR SPACING APART PANES OF A MULTIPLE PANE UNIT

[75] Inventor: Guy Guillemet, Terrebonne, Canada

[73] Assignee: Bay Mills Limited, Quebec, Canada

[*] Notice: This patent issued on a continued prosecution application filed under 37 CFR 1.53(d), and is subject to the twenty year patent term provisions of 35 U.S.C. 154(a)(2).

[21] Appl. No.: 589,630

[22] Filed: Jan. 22, 1996

Related U.S. Application Data

[62] Division of Ser. No. 189,145, Jan. 31, 1994, Pat. No. 5,485,709, which is a continuation of Ser. No. 813,577, Dec. 26, 1991, Pat. No. 5,313,762.

[51] Int. Cl.⁶ ........................................ B23P 17/00
[52] U.S. Cl. .................... 29/897.312; 29/469.5; 29/527.1; 264/171.14; 264/171.16
[58] Field of Search .................. 29/469.5, 527.1, 29/897, 897.31, 897.312, 897.34, 527.2, 527.4, 432, 432.1; 264/259, 260, 265, DIG. 65, 171.16, 171.14, 171.12, 171.11, 252, 271.1

[56] References Cited

U.S. PATENT DOCUMENTS

| | | | |
|---|---|---|---|
| 2,303,897 | 12/1942 | Smith | 20/56.5 |
| 3,030,673 | 4/1962 | London | 20/56.5 |
| 3,068,136 | 12/1962 | Reid | 156/200 |
| 3,226,903 | 1/1966 | Lillethun | 52/616 |
| 3,624,885 | 12/1971 | Holliday et al. | 29/897.312 |
| 3,829,545 | 8/1974 | Van Vlaenderen | 264/DIG. 65 X |
| 3,981,111 | 9/1976 | Berthagen | 52/171 |
| 3,994,109 | 11/1976 | Pandell | 52/304 |
| 4,057,945 | 11/1977 | Kessler | 52/398 |
| 4,080,482 | 3/1978 | Lacombe | 428/34 |
| 4,113,905 | 9/1978 | Kessler | 428/34 |
| 4,222,209 | 9/1980 | Peterson | 52/172 |
| 4,222,213 | 9/1980 | Kessler | 52/790 |
| 4,261,145 | 4/1981 | Brocking | 52/172 |
| 4,322,926 | 4/1982 | Wolflingseder et al. | 52/172 |
| 4,342,144 | 8/1982 | Doguchi | 29/897.312 |
| 4,411,115 | 10/1983 | Marzouki et al. | 52/309.1 |
| 4,438,609 | 3/1984 | Nielson et al. | 52/208 |
| 4,455,796 | 6/1984 | Schoofs | 52/172 |
| 4,468,905 | 9/1984 | Cribben | 52/172 |
| 4,479,988 | 10/1984 | Dawson | 428/34 |
| 4,551,364 | 11/1985 | Davies | 428/34 |
| 4,564,540 | 1/1986 | Davies, et al. | 428/34 |
| 4,651,482 | 3/1987 | Borys | 52/172 |
| 4,652,472 | 3/1987 | Davies | 428/34 |
| 4,658,553 | 4/1987 | Shinagawa | 52/172 |
| 4,719,728 | 1/1988 | Eriksson et al. | 52/172 |
| 4,850,175 | 7/1989 | Berdan | 52/790 |
| 5,094,055 | 3/1992 | Berdan | 52/397 |
| 5,249,353 | 10/1993 | Kranz | 29/469.5 X |
| 5,313,762 | 5/1994 | Guillemet | 52/790 |
| 5,439,716 | 8/1995 | Larsen | 428/34 |
| 5,461,840 | 10/1995 | Taylor | 52/786.13 |
| 5,466,534 | 11/1995 | Newby | 428/457 |
| 5,485,709 | 1/1996 | Guillemet | 52/786.13 |

*Primary Examiner*—Joseph M. Gorski
*Attorney, Agent, or Firm*—Fitzpatrick, Cella, Harper & Scinto

[57] ABSTRACT

A method of making an enclosed, hollow insulating spacer for spacing apart panes of a multiple pane unit. The method includes steps of forming metal into first and second leg members for a spacer, preheating the first and second leg members of the spacer near the melting point of one of a synthetic resin material and a composite synthetic resin material, feeding the preheated first and second leg members of the spacer into a crosshead extruder together with one of the resin materials to embed by crosshead extrusion only a portion of each of the first and second leg members into the material, to affix the embedded portion of each of the leg members to the material and to form from the material a first bridge member that extends between the leg members and spans across one end of each of the leg members, and providing a second bridge member that connects the opposite ends of the leg members. Thereby defined is an enclosed channel portion of an insulating spacer, which has a hollow interior, by a configuration of the first bridge member, the first and second leg members and the second bridge member.

10 Claims, 3 Drawing Sheets

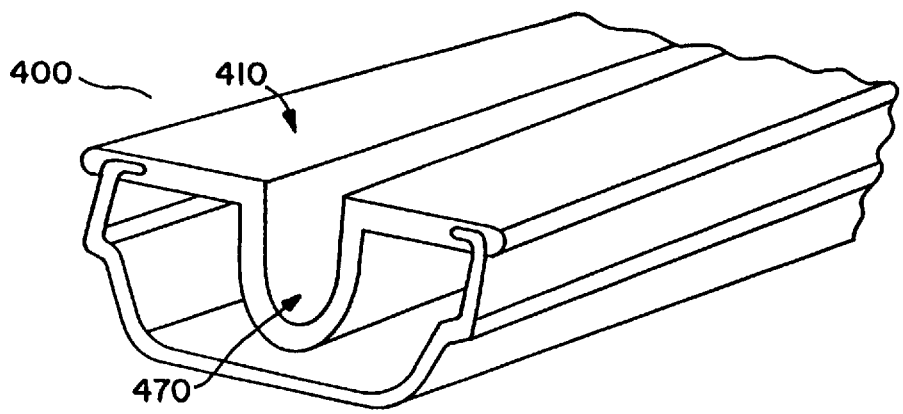
FIG. 4
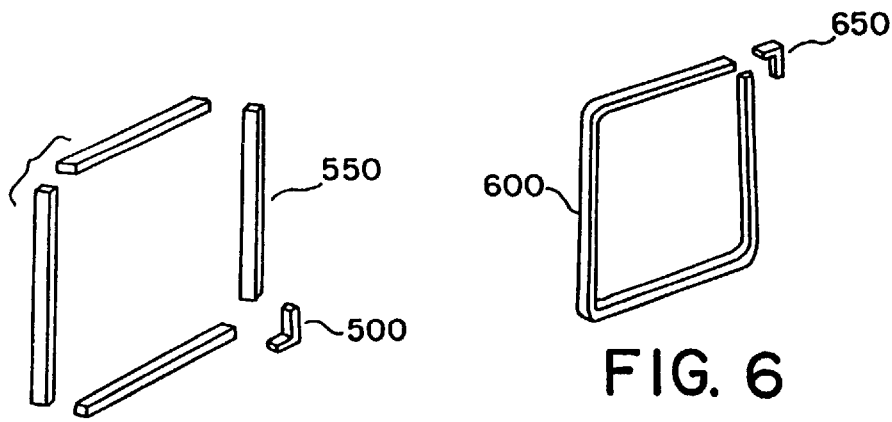
FIG. 5
FIG. 6
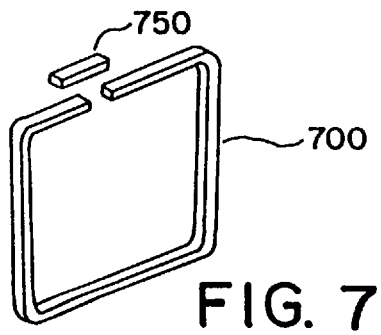
FIG. 7

METHOD OF MAKING AN INSULATING SPACER FOR SPACING APART PANES OF A MULTIPLE PANE UNIT

This application is a divisional of prior application, application Ser. No. 08/189,145, filed Jan. 31, 1994, which will issue on Jan. 23, 1996, as U.S. Pat. No. 5,485,709, which is a continuation of prior application, application No. 07/813,577 filed Dec. 26, 1991, now U.S. Pat. No. 5,313,762.

BACKGROUND OF THE INVENTION

1. Field of the Invention

This invention generally relates to an insulating spacer and in particular to an insulating spacer for creating a thermally insulating bridge between spaced-apart panes in a multiple glass window unit, for example, to improve the thermal insulation performance of the unit. This invention also relates to methods of making such an insulating spacer.

2. Description of the Related Art

An important consideration in the construction of buildings is energy conservation. In view of the extensive use of glass in such construction, a particular problem is heat loss through glass surfaces. One solution to this problem has been an increased use of insulating glass units comprising basically two or more glass panels separated by a sealed dry air space. Sealed insulating glass units generally require some means of precisely separating the glass panels, such as by spacers.

The spacers currently used are generally tubular channels made entirely of steel, aluminum or some other metal containing a desiccant to adsorb moisture from the space between the glass panels to thus avoid condensation problems and to keep the sealed air space dry. Tubular spacers are commonly roll-formed into the desired profile shape. Steel spacers are generally cheaper and stronger, but aluminum spacers are easier to cut and install. Aluminum also provides lightweight structural integrity, but it is expensive. Spacers made entirely of plastic also have been used to a limited extent.

There are certain significant factors that influence the suitability of the spacer, particularly the heat conducting properties and the coefficient of expansion of the material. Since a metal spacer is a much better heat conductor than the surrounding air space, its use leads to the conduction of heat between the inside glass pane and the outside glass pane resulting in heat dissipation, energy loss, moisture condensation and other problems. Further, the coefficient of expansion of commonly used spacer materials is much higher than that of glass. Thus, heat conduction results in a differential dimensional change between the glass and the spacer, thereby causing stresses to develop in the glass and in the seal. This can result in damage to and failure of the sealed glass unit, such as by sufficient lengthwise shrinkage of the spacer to cause it to pull away from the sealant.

To date, the most common material commercially used in the manufacture of such spacer units has been metal. Metal has been used mainly because it has a coefficient of expansion similar to that of glass, and because this property is important in the manufacture of such a unit. Any difference in thermal expansion causes problems. This is particularly true in climates that have large changes in temperature. These consequences include cracking of the glass and at least breaking of the seal between the panes of glass.

Some experimentation has been made with all-plastic spacers, particularly nylon, vinyl, polyvinyl chloride, polycarbonate or other extruded plastic spacers, but these units generally have been thin and structurally weak. In fact, these thin, non-metal spacers can bend undesirably and collapse. Furthermore, to date, most thermoplastics have been unacceptable for use as spacers because they give off volatile materials, e.g., plasticizers, which can cloud or fog the interior glass surface. In view of the above-noted drawbacks, such all-plastic spacers generally have been found unsatisfactory.

To date, therefore, metal has been the generally accepted material even though this material has a number of disadvantages. In particular, the thermal conductivity of metal is considerably higher than that of glass or of the air space between the panes of glass. In a sealed unit, heat from within a building tries to escape in winter, and it takes the path of least resistance. The path of least resistance is around the perimeter of a sealed window unit, where the metal spacer strip is provided. Metal spacers contacting the inner and outer panes of glass act as conductors between the panes and provide an easy path for the transmission of heat from the inside glass panel to the outside panel. As a result, under low temperature conditions in winter, and when the seal fails, for instance, condensation of moisture can occur inside the insulating glass or on the surfaces of the inner glass panel. Also, heat is rapidly lost from around the perimeter of the window, often causing a ten to twenty degree Fahrenheit temperature drop at the perimeter of the window relative to the center thereof. Under extreme conditions in winter, a frost line can occur around the perimeter of the window unit.

The above-noted temperature differential also results in differential shrinkage between the center of the glass pane and the perimeter. Then, stress cracks can develop in the glass or the seal can be broken. When the outside seal breaks down, air can enter the space between the windows carrying water vapor which is deposited inside the panes. Condensation of this moisture causes fogging of the window unit. Many window units tend to fail due to such stress cracks or loss of seal.

Another problem inherent in previous spacer arrangements is that a rigid spacer provides an excellent path for the transmission of sound from the outer panel to the inside panel. This poses a particular problem in high-noise areas such as airports. Other institutions such as hospitals also have a need for low sound transmission glass units.

A still further problem with conventional glass units is related to deflection of the panels under the influence of high winds, traffic noise, or internal pressure changes owing to expansion or contraction of the air mass contained within the glass unit. This action imposes high stresses on the glass panels and can break the seal between the spacer and the glass thus allowing moisture to enter. In extreme cases, the glass panels can break.

The prior art has attempted to overcome the drawbacks noted above by providing composite spacers. For instance, U.S. Pat. No. 4,113,905 discloses a composite foam spacer for separation of double insulated glass panes. The spacer includes a thin extruded metal or plastic core and a relatively thick foam plastic layer cast to the core.

In order to make such a spacer, a thin extruded or roll-formed core is supported in an elongated two-piece casting mold by a support rod. Curable foam plastic is cast into the annular space formed between the core and the mold. The foam is then cured and allowed to cool so that it shrinks to form a 25 to 150 mil thick layer around the core. The core itself is very thin, on the order of ten mils, and is made of an extruded or roll-formed material, either metal such as aluminum or steel, or some type of extrudable plastic such as PVC or phenylene oxide polymer. The foam casting material is a foam-in-place phenolic, polyester or polyurethane resin.

Such a spacer provides advantages due to the structural rigidity provided by the metal base. However, the spacer suffers from disadvantages in that the relatively thin coating of foam material may not serve as a thermally insulating bridge over the continuous metal tube. Further, such a spacer can be expensive to manufacture, because conventional injection molding techniques can be impractical to make such a thin hollow elongated body.

U.S. Pat. No. 4,222,213 is an improvement over the spacer taught in the '905 patent. The spacer in the '213 patent includes a thin plastic insulating shape which is extruded and thereafter fitted by contact pressure or friction, over a portion of a conventional extruded or roll-formed metal spacer and has projecting contacts which abut the glass panes. The plastic insulating overlay can be formed over a conventional extruded aluminum spacer and from an extrudable thermoplastic resin. However, the force fit and the bimaterial construction of such a spacer can result in separation of the two components with changes in temperature due to the different thermal expansion coefficients of the metal and the plastic. This is undesirable.

Accordingly, a need has arisen to provide an insulating spacer which creates a thermally insulating bridge between spaced-apart panes in a multiple glass unit and which overcomes the above-noted drawbacks with conventional insulating spacers and those associated with conventional spacer manufacturing techniques.

SUMMARY OF THE INVENTION

It is an object of the present invention to provide an improved thermally insulating spacer for a multiple glass unit which solves or overcomes the drawbacks noted above with respect to conventional spacers.

It is another object of the present invention to provide an improved method of manufacturing such an improved composite insulating spacer to provide an improved and satisfactory bonding between the metal and plastic materials in such a composite spacer.

It is another object of this invention to create a thermally insulating bridge to reduce heat transfer from one pane of glass to another through the insulating spacer of the present invention. This invention thus keeps the inner pane of glass several degrees warmer than it might otherwise be in the winter, while preventing condensation that otherwise may occur.

It is yet another object of the present invention to provide an insulating spacer with a coefficient of expansion approximately equal to that of glass.

It is still another object of the present invention to improve thermal insulation, particularly in buildings, and to provide for improved multiple insulated glass.

These and other objects that will become apparent may be better understood by the detailed description provided below.

The present invention provides an insulating spacer for spacing apart panes of a multiple pane window unit, for example, and for defining an insulated space between the panes. The insulating spacer includes a top bridge member, a metallic first leg member and a metallic second leg member, a bottom bridge member and a channel portion defined by the configuration of the top bridge member, the first and second leg members and the bottom bridge member. The top bridge member is made from a synthetic resin material or composites thereof, and contacts the panes of the multiple pane unit and creates a thermally insulating bridge between the panes. The top bridge member can include openings. The first and second leg members are embedded by crosshead extrusion into the top bridge member. The first and second leg members can be bent into a zig-zag configuration. The bottom bridge member is substantially parallel to the top bridge member. The channel portion can contain desiccant material for adsorbing moisture from the space between the window panes through the openings in the top bridge member. In one embodiment, the bottom bridge member is roll-formed from the same piece of material as the first and second leg members. In another embodiment, the bottom bridge member is formed from a synthetic resin or composite material the same as, or similar to, that of the top bridge member.

The present invention can be customized to a particular installation or to a customer's demand by shaving the outer sides of the top bridge member and by bending the first and second leg members to the desired dimensions. The first and second leg members provide structural rigidity and intended bendability in fabrication and allow the spacer to conform to and retain varying dimensions.

The present invention improves the thermal performance of the insulated glass units along the edge of the assembly.

The present invention also provides methods of making the insulating spacer of the present invention. One method includes the steps of: roll-forming metal into first and second leg members of a metal channel, preheating the leg members of the metal channel near the melting point of a synthetic resin or composite material, crosshead extruding the first and second leg members of the metal channel in a crosshead extruder into the synthetic resin or composite material to embed the first and second leg members in the material and to form a first bridge member, and defining a channel portion of an insulating spacer by the configuration of the first bridge member, the first and second leg members and a second bridge member. The second bridge member can either be roll-formed from the same piece of material as the first and second leg members, or the second bridge member can be formed from a synthetic resin or composite material the same as, or similar to, that of the first bridge member. The first and second leg members can be bent into a desired configuration. The desired configuration can be zig-zag.

A better understanding of these and other advantages of the present invention, as well as objects attained for its use, may be had by reference to the drawings and to the accompanying descriptive matter, in which there are illustrated and described preferred embodiments of the invention.

BRIEF DESCRIPTION OF THE DRAWINGS

FIG. 4 shows yet another embodiment of the present invention, when utilized with a decorative panel, for instance, to provide a triple pane window arrangement.

FIG. 5 is a perspective view of a first manner of joining the insulating spacer of the present invention.

FIG. 6 is a perspective view of a second manner of joining the insulating spacer of the present invention.

FIG. 7 is a perspective view of a third manner of joining the insulating spacer of the present invention.

Throughout the views, like or similar reference numerals have been used for like or corresponding parts.

DESCRIPTION OF THE PREFERRED EMBODIMENTS

The insulating spacer of the present invention is designed as a double seal insulating spacer for spacing apart panes of, for example, a double glass window unit (not shown) and for defining an insulated space between the panes. For ease of discussion, reference is made herein to double pane glass window units. However, the present invention can be utilized with multiple pane units, and is not limited to window units made from glass, or even to window units. Rather, the present invention can be used with units made from plastic and other materials, and to doors, display cases and like applications where insulating spacers are required.

Figure 1A:
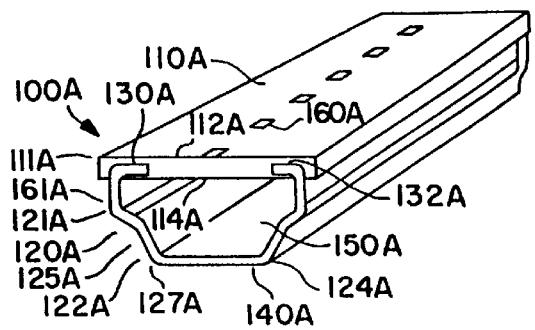
FIGS. 1A and 1B are perspective views of alternate first embodiments of a double seal insulating spacer of the present invention.

Referring now to FIG. 1A, a first embodiment of a double seal insulating spacer of the present invention is designated by reference numeral 100A.

The spacer 100A includes a top bridge member 110A for contacting the inner and outer window panes of a double pane window unit, for instance.

In this embodiment and in each of the embodiments discussed below, the top bridge member is made of synthetic resin materials, such as polyvinyl chloride resins, polycarbonate resins or other suitable synthetic resins, or from composites thereof including those of glass fibers or beads, for example. In the preferred embodiments, a composite of a polyvinyl chloride (PVC) resin filled with glass fibers is used. It is most preferred to use such a composite in which twenty percent of the composite is glass fibers. For example, a composite, 902GR20, sold by the BF Goodrich Co. is suitable. This composite happens to use high temperature resistant PVC's. However, composites of standard PVC's also can be used in this invention. It is preferred that the amount of glass fibers in the composite be within a range of ten to thirty percent. However, this range could be extended from zero to fifty percent, if necessary. Increasing the amount of glass fill provides a better coefficient of expansion, since it is closer to that of the glass.

One having ordinary skill in the art recognizes that other synthetic resin materials or composites providing the desired properties can be used. For instance, polycarbonates such as those sold by the General Electric Co. under the trademarks of GELOY and LEXAN can be used. Other materials performing the same or similar functions are also considered to be within the scope of my invention.

The top bridge member 110A is of unitary construction and includes an upper surface 112A and a lower surface 114A substantially parallel to the upper surface 112A. The top bridge member 110A can include openings 160A.

Channel member 120A includes first and second legs 122A and 124A, respectively. In this embodiment and in each of the embodiments discussed below, the first and second legs of the channel member 120A can be made of metal such as galvanized steel, aluminum, or composites thereof.

As discussed below, first leg 122A and second leg 124A are crosshead extruded into the top bridge member 110A. In this embodiment, as shown, first leg 122A includes an optional extension 130A, while second leg 124A includes an optional extension 132A, which extensions, if utilized, can be crosshead extruded into the top bridge member 110A. Extensions 130A and 132A can improve the structural properties of the spacer 110A. While extensions 130A and 132A have been shown as generally being inwardly extending and L-shaped, the extensions can extend outwardly and can be of other shapes. One having ordinary skill in the art also recognizes that other configurations are within the concepts of the present embodiment. For instance, extensions 130A and 132A could be knurled or serrated, or top bridge member 110A could be notched or indented to receive those extensions. Of course, the extensions 130A and 132A can be omitted altogether if desired. However, it is important that the top bridge member 110A and the first leg 122A and the second leg 124A be crosshead extruded.

As used herein, the term "crosshead extruded" is intended to mean that the first leg 122A and second leg 124A are embedded within the top bridge member 110A in fabrication. It is preferred that the channel member 120A be roll-formed from metal, and that top bridge member 110A of synthetic resin or composite material be extruded while in its molten or semi-molten state onto and around portions of the first and second leg members of the metal channel member 120A. When the synthetic resin or composite material of the top bridge member 110A is being extruded in a crosshead extruder, the metal roll-former pushes the channel member 120A through this crosshead extruder. A die is provided to form the top bridge member 110A into the desired shape. Preferably, the channel member 120A is heated almost to the temperature of the resin or composite material being extruded. The crosshead extruder dispenses the necessary quantity of synthetic resin or composite material to form the top bridge member 110A and pushes the top bridge member 110A over the first and second leg members of the channel member 120A. In this sense, it is a dual extrusion process, because of the cooperation of the two materials, the synthetic resin or composite top bridge member 110A and the first and second legs of the metal channel member 120A. This technique is referred to in the art as crosshead extrusion.

It is believed that when utilized, the extensions of each of the first leg 122A and second leg 124A aid in affixing the two materials together. These extensions also can aid in the bendability of the final product, because the extensions of the first and second leg members are firmly embedded in the top bridge member 110A.

Also included is a bottom bridge member 140A, which is substantially parallel to the top bridge member 110A. In this embodiment, the bottom bridge member 140A is roll-formed from the same piece of material as the first and second legs of the channel member 120A. This design provides a simple construction. Channel portion 150A is defined by the configuration of the top bridge member 110A, the first and second legs of the channel member 120A and the bottom bridge member 140A.

In this embodiment, as in each of the embodiments discussed below, the channel portion 150A can contain a desiccant material (not shown) for adsorbing moisture from the space between the window panes through the openings 160A in the top bridge member 110A. Desiccants, known in the art, may include zeolytes or other moisture adsorbing materials. Accordingly, openings 160A are large enough to allow vapor adsorption, but are small enough to confine any desiccant material (not shown) which can be contained within channel portion 150A.

The top bridge member 110A can be shaved on its outer edges to a desired dimension to separate the panes to an accurate dimension. Generally, the top bridge member 110A is about 0.500 inches in overall width and about 0.045 inches in height. The bottom bridge member 140A is narrower than the top bridge member and is about 0.440 inches in width. The channel member 120A also is narrower than the top bridge member 110A. The overall height of the insulating spacer 100A is on the order of about 0.297 inches. Of course, in this embodiment and in the ones discussed below, dimensions other than those discussed can be utilized, as installation requires. Therefore, the present invention is not limited to the dimensions discussed herein.

In this embodiment and in each of the embodiments discussed below, the channel member 120A can be bent to desired dimensions. The first and second leg members provide structural rigidity and intended bendability in fabrication and allow the spacer 100A to conform to and retain varying dimensions. In each case, it is preferred that the outermost dimension of the insulating spacer 100A be provided by the top bridge member 110A so that only the synthetic resin or composite material thereof, and no metal, contacts the inner and outer panes of the window unit. This significantly reduces the heat transfer between the panes. In turn, condensation is prevented by the reduced temperature differential.

In this embodiment, the top bridge member 110A can be trapezoidal in shape, being truncated at about a 45° angle on each side, so that a reduced dimension, on the order of about 0.015 inches, contacts the inner and outer panes. This minimized surface area contact even further reduces the heat transfer between the panes.

Spacer 100A is a double seal insulating spacer. A first sealant (not shown), such as polyisobutylene or an equivalent, can be injected by known techniques on either side of spacer 100A into cavity portion 161A defined by edge 111A of top bridge member 110A and bend portion 121A of channel member 120A, for example. If desired, a second sealant (not shown), such as polysulfide or polyurethane, can be injected by known techniques on either side of spacer 100A into cavity portion 125A defined by bend portion 121A and bend portion 127A of channel member 120A, for example.

Figure 1B:
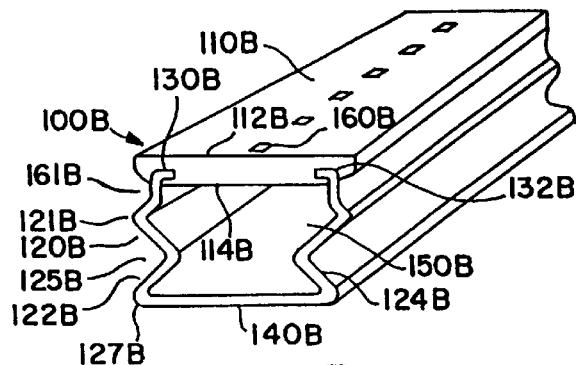

Referring now to FIG. 1B, an alternative of the first embodiment, of the insulating spacer of the present invention is designated by reference numeral 100B. Like parts in this alternative embodiment are designated by reference numerals similar to those in the first embodiment, modified by the suffix letter.

Spacer 100B includes a top bridge member 110B for contacting the inner and outer panes of a double pane window unit, for instance. As discussed above, top bridge member 110B is made of a synthetic resin or composite material. The top bridge member 110B is of unitary construction and includes an upper surface 112B and a lower surface 114B substantially parallel to the upper surface 112B. The top bridge member 110B can include openings 160B.

Channel member 120B includes first and second legs 122B and 124B, respectively. In this alternative of the first embodiment and in each of the alternative embodiments discussed below, first leg 122B and the second leg 124B are each bent into a zig-zag configuration. However, in these alternative embodiments, bend configurations other than zig-zag can be utilized. The zig-zag configuration of the channel member 120B provides advantages in fabrication of the spacer, allowing the channel member 120B to be readily bent to desired dimensions.

First leg 122B and second leg 124B are crosshead extruded into the top bridge member 110B. As discussed above, by being crosshead extruded, the first leg 122B and second leg 124B are embedded within the top bridge member 110B. Also, as discussed above, first leg 122B can include an extension 130B, while second leg 124B can include an extension 132B, if desired. These extensions can extend inwardly or outwardly.

Also included is a bottom bridge member 140B, which is substantially parallel to the top bridge member 110B. In this embodiment, the bottom bridge member 140B is roll-formed from the same piece of material as the first and second legs of the channel member 120B. Channel portion 150B is defined by the configuration of the top bridge member 110B, the first leg and second legs of the channel member 120B and the bottom bridge member 140B.

The top bridge member 110B also can be shaved on its outer edges to a desired dimension to separate the panes to an accurate dimension, and can be trapezoidal in shape, being truncated at about a 45° angle on each side, so that a reduced dimension contacts the inner and outer panes.

Spacer 100B also is a double seal insulating spacer. A first sealant (not shown), such as polyisobutylene or an equivalent, can be injected into cavity portion 161B and if desired, a second sealant (not shown), such as polysulfide or polyurethane, can be injected into cavity portion 125B.

Figure 2A:
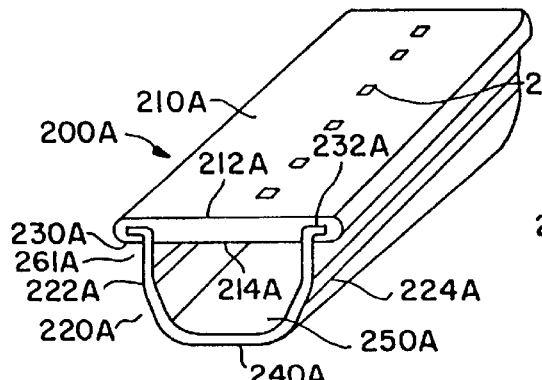
FIGS. 2A and 2B are perspective views of alternate second embodiments of a single seal insulating spacer of the present invention.

Referring now to FIG. 2A, a second embodiment of the insulating spacer of the present invention is designated by reference numeral 200A.

Spacer 200A is designed as a single seal insulating spacer. A single sealant such as polysulfide or polyurethane (not shown), can be injected into cavity portion 261A beneath top bridge member 210A.

Top bridge member 210A contacts the inner and outer window panes of a double glass window unit, for instance. The top bridge member 210A is made of a synthetic resin or composite material. The top bridge member 210A includes an upper surface 212A and a lower surface 214A substantially parallel to the upper surface 212A. The top bridge member 210A can include openings 260A.

Channel member 220A includes first and second legs 222A and 224A, respectively. First leg 222A and second leg 224A are crosshead extruded into the top bridge member 210A. First leg 222A can include an extension 230A, while second leg 224A can include an extension 232A. Extensions 230A and 232A can extend outwardly or inwardly.

Bottom bridge member 240A is substantially parallel to the top bridge member 210A. In this embodiment, the bottom bridge member 240A is roll-formed from the same piece of material as the first and second legs of the metal channel member 220A. Channel portion 250A is defined by the configuration of the top bridge member 210A, the first and second legs of the channel member 220A and the bottom bridge member 240A.

The top bridge member 210A can be shaved on its outer edges to a desired dimension to separate the panes to an accurate dimension. Generally, the top bridge member 210A is about 0.500 inches in overall width and about 0.055 inches in height. In this embodiment, the top bridge member can be substantially rectangular in shape. The bottom bridge member 240A is typically narrower than the top bridge member 210A and is about 0.360 inches in width. The overall height of the insulating spacer 200A is on the order of 0.290 inches. As discussed above, these dimensions are not limiting.

Figure 2B:
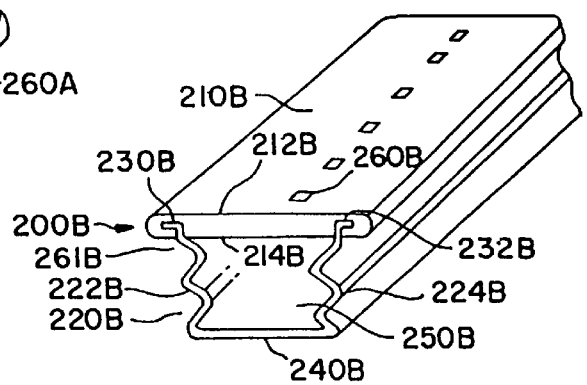

Referring now to FIG. 2B, an alternative of the second embodiment of the insulating spacer of the present invention is designated by reference numeral 200B.

Spacer 200B is designed as a single seal insulating spacer. A sealant such as polysulfide or polyurethane (not shown), can be provided in cavity portion 261B beneath top bridge member 210B.

Top bridge member 210B contacts the panes of a double glass window unit, for instance. The top bridge member 210B is made of a synthetic resin or composite material, and includes an upper surface 212B and a lower surface 214B substantially parallel to the upper surface 212B. The top bridge member 210B can include openings 260B.

Channel member 220B includes first and second legs 222B and 224B, respectively. In this embodiment, first leg 222B and the second leg 224B are each bent into a zig-zag configuration. First leg 222B and second leg 224B are crosshead extruded into the top bridge member 210A. First leg 222B can include an extension 230B, while second leg 224B can include an extension 232B. Extensions 230B and 232B can extend inwardly or outwardly.

Bottom member 240B is substantially parallel to the top bridge member 210B. In this embodiment, the bottom bridge member 240B is roll-formed from the same piece of material as the first and second legs of the metal channel member 220B. Channel portion 250B is defined by the configuration of the top bridge member 210B, the first and second legs of the channel member 220B and the bottom bridge member 240B.

Figure 3A:
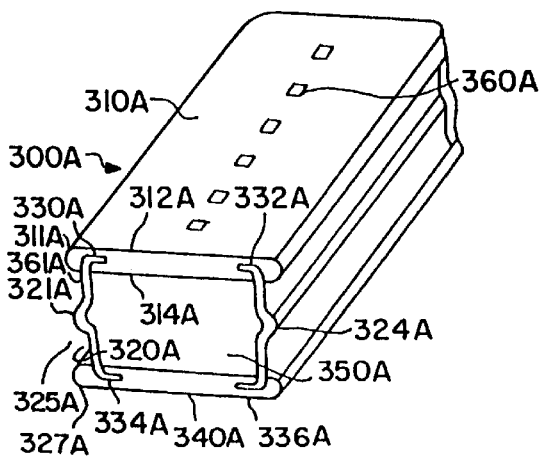
FIGS. 3A and 3B are perspective views of alternate third embodiments of a double seal insulating spacer of the present invention.

Referring now to FIG. 3A, a third embodiment of the insulating spacer of the present invention is designated by reference numeral 300A.

Spacer 300A is designed as a double seal insulating spacer and includes a top bridge member 310A for contacting the panes of a double glass window unit, for instance. The top bridge member 310A is comparable to the top bridge member 110A of the first embodiment.

Channel member 320A includes first and second legs 322A and 324A, respectively. First leg 322A and second leg 324A are crosshead extruded into the top bridge member 310A. First leg 322A can include an upper extension 330A, while second leg 324A can include an upper extension 332A. These extensions can be inwardly or outwardly facing.

Bottom bridge member 340A is substantially parallel to the top bridge member 310A. In this embodiment, the bottom bridge member 340A is made of a synthetic resin or composite material similar to, or the same as, that of the top bridge member 310A. The first leg 322A and the second leg 324A of the channel member 320A are crosshead extruded into the bottom bridge member 340A in the manner discussed above with respect to the top bridge members of this and the previous embodiments. For this purpose, and if desired, the first leg 322A and the second leg 324A of the channel member can include lower extensions 334A and 336A, respectively. These extensions can extend inwardly or outwardly. In crosshead extruding the first and second legs of the channel member 320A into the top bridge member 310A and the bottom bridge member 340A, the roll former pushes the legs through the crosshead extruder, while the crosshead extruder feeds sufficient synthetic resin or composite material in a molten or semi-molten state from respective feeds to form the top and bottom bridge members over the leg members. Dies are provided to form the bridge members into the desired shapes.

Channel portion 350A is defined by the configuration of the top bridge member 310A, the first and second legs of the channel member 320A and the bottom bridge member 340A.

In application, the top bridge member 310A can be shaved on its outer edges to separate the inner and outer panes to an accurate dimension. Generally, the top bridge member 310A can be about 0.500 inches in overall width. The bottom bridge member 340A can be narrower than the top bridge member and about 0.440 inches in width. The overall height of the insulating spacer 300A can be about 0.297 inches.

Spacer 300A is a double seal insulating spacer. A first sealant (not shown), such as polyisobutylene or an equivalent, can be injected into cavity portion 361A defined by edge 311A of the top bridge member 310A and bend portion 321A of channel member 320A, for example. If desired, a second sealant (not shown), such as polysulfide or polyurethane, can be injected into cavity portion 325A defined by bend portion 321A and edge portion 327A of channel member 320A, for example.

Figure 3B:
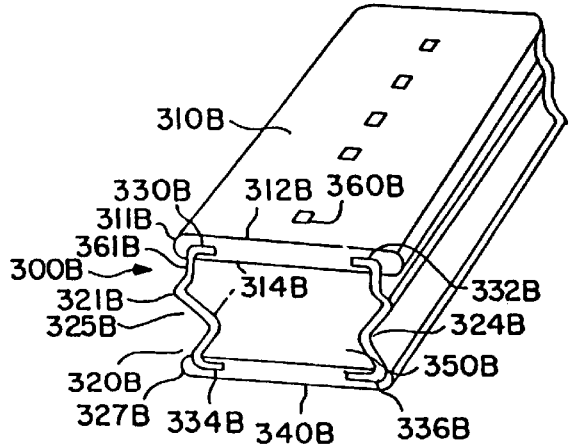

Referring now to FIG. 3B, an alternative of the third embodiment of the insulating spacer of the present invention is designated by reference numeral 300B.

Spacer 300B is designed as a double seal insulating spacer and includes a top bridge member 310B for contacting the inner and outer window panes of a double glass window unit. The top bridge member 310B is comparable to the top bridge member 110B of the alternative of the first embodiment.

Channel member 320B includes first and second legs 322B and 324B, respectively. First leg 322B and second leg 324B are crosshead extruded into the top bridge member 310B. First leg 322B can include an upper extension 330B, while second leg 324B can include an upper extension 332B. The first leg 322B and the second leg 324B are each bent into a zig-zag configuration.

Bottom bridge member 340B is substantially parallel to the top bridge member 310B. In this embodiment, the bottom bridge member 340B is made of a synthetic resin or composite material similar to, or the same as, that of the top bridge member 310B. The first leg 322B and the second leg 324B of the channel member 320B also are crosshead extruded in the manner discussed above into the bottom bridge member 340B. For this purpose, and if desired, the first leg 322B and the second leg 324B of the channel member 320B can include lower extensions 334B and 336B, respectively. These extensions can extend inwardly or outwardly.

A primary distinction between the insulating spacers 300A and 300B of the FIG. 3A and FIG. 3B embodiments and those spacers of the embodiments of FIGS. 1A and 1B and FIGS. 2A and 2B is that each of the bottom bridge members 340A and 340B is made of a synthetic resin or composite material similar to, or the same as, that of the top bridge member 310B. Thus, insulating spacers 300A and 300B substantially eliminate all heat transfer through channel member 320A and 320B by providing a complete synthetic resin or composite material bridge between the panes of glass and between the top bridge member 310A and 310B and the bottom bridge member 340A and 340B.

Channel portion 350B is defined by the configuration of the top bridge member 310B, the first and second legs of the channel member 320B and the bottom bridge member 340B.

Spacer 300B is a double seal insulating spacer. A first sealant (not shown), such as polyisobutylene or an equivalent, can be into cavity portion 361B and if desired, a second sealant (not shown), such as polysulfide or polyurethane, can be injected into cavity portion 325B.

Properties of the synthetic resin or composite material used for the top bridge member of the first, second and third embodiments and the bottom bridge member of the third embodiment and its alternative are that the material possesses good extrudability characteristics, provides little or no "out-gassing" (i.e., does not emit volatile materials which can cloud the glass), ideally possesses bendability, and tends to act as a moisture (vapor) barrier.

FIG. 4 shows yet another embodiment of the present invention, when utilized with a decorative panel (not shown), for instance, to provide a triple pane window arrangement. FIG. 4 is a representative example and is shown as applied to the first embodiment. However, the embodiment of FIG. 4 can be applied to any of the embodiments or their alternatives discussed above.

In FIG. 4, top bridge member 410 of the insulating spacer 400 is shown with a cavity, recess or trough portion 470 to receive, for example, a frame to hold a decorative panel (not shown), to provide a triple pane window arrangement. Those skilled in the art recognize that the top bridge member 410 can be readily formed from the synthetic resin or composite material of the top bridge members of the previous embodiments.

As shown in FIGS. 5 through 7, the insulating spacers of the present invention can be fabricated in various manners. For example, as shown in FIG. 5, plastic corner pieces 500 can be used to assemble four spacer pieces 550 to make an insulating spacer frame for use in an insulated glass assembly. Alternatively, as shown in FIG. 6, one spacer 600 can be bent at three corners, then filled with desiccant, if desired, and closed at the last corner with a corner key 650. As a further alternative, as shown in FIG. 7, spacer 700 can be filled with desiccant, if desired, and bent at four corners and then closed by joining the remaining two ends with a connector 750. It is believed that the zig-zag configuration of the channel members of the alternatives of the previous embodiments assists in the bendability of these spacers, so that 90° bends can be readily formed.

Figure 8A:
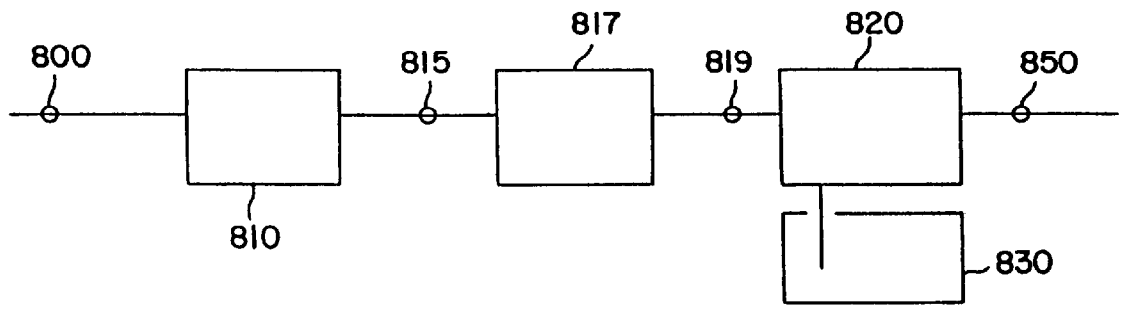
FIG. 8A is a schematic diagram of a method of making the insulating spacer of the present invention.

FIG. 8A schematically shows a method of making an insulating spacer of the present invention. The metal 800, such as steel, aluminum or composites thereof, for the first and second leg members of the insulating spacer is first roll-formed in roll-forming machine 810 to produce continuous roll-formed first and second leg members of a metal channel 815. The metal 800 also can be bent into a desired configuration in the roll-forming machine 810. This desired configuration can be zig-zag, as discussed above. In addition, the first and second leg members can be provided with extensions on one or both ends thereof, can be knurled or serrated or otherwise prepared for the extrusion process.

The first and second leg members of metal channel 815 are preheated in preheater 817 close to the melting point of a resin or composite material 830. This preheating cleans and prepares the metal to receive a pre-bonding coating, if desired. The melting point can be between about 325° F. and 375° F., depending on the resin or composite used. The first and second leg members of the metal channel 815 can be treated with a pre-bonding coating, known in the art to improve bonding of metals to resins or composites.

The preheated first and second leg members of metal channel 815 exit preheater 817 and are driven through an extrusion die in a crosshead extruder 820. In a preferred embodiment, the die is set up on the extruder 820 and is notched so that the first and second leg members of the metal channel 815 pass through the die at a preferred angle, such as 90 degrees with respect to the resin extruder. Of course, other angles can be used as desired. When the firsthand second leg members of the metal channel 815 pass through the die of the extruder 820, a synthetic resin or composite material bridge is extruded to a desired thickness, joining the two leg members of the metal channel 815. The metal leg members are embedded into the synthetic resin or composite material in a continuous process in the extrusion die in the extruder 820.

Figure 8B:
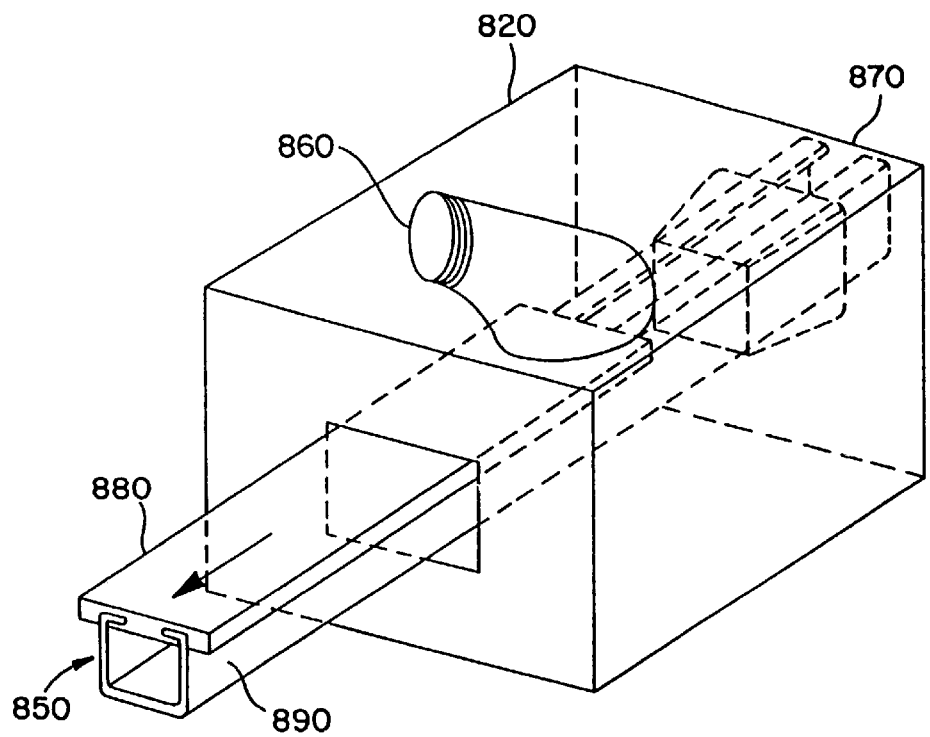
FIG. 8B is a perspective view of a crosshead extruder used in a method of making the insulating spacer of the present invention.

Crosshead extruder 820 is better shown in FIG. 8B. The path of travel of the spacer 850 is indicated by the arrow. Extruder 820 includes a synthetic resin or composite material intake 860 and a metal intake 870. Extruder 820 can include heating coils (not shown) to preheat the metal, in which case, preheater 817 would be incorporated within extruder 820. Extruder 820 also can include cooling coils (not shown) to cool the extruded material of the bridge member 880 exiting the extruder 820. In the example shown in FIG. 8B, a top bridge member 880 is shown being formed over first and second leg members of a channel member 890. However, one having ordinary skill in the art recognizes the extruder 820 also can be used to extrude top and bottom bridge members of a channel member, by providing a second synthetic resin or composite material intake (not shown) and by utilizing one or a pair of dies arranged to maintain the first and second leg members in the necessary spaced apart position.

As discussed above, the resin or composite material 830 is extruded from crosshead extruder 820 over the preheated roll-formed metal 819 by crosshead extrusion so that the first and second leg members of metal channel 815 are embedded within the resin or composite material 830 by the extrusion process. The roll-former 810 pushes the roll-formed first and second leg members of the metal channel 815 and the extruder 820 feeds a sufficient amount of resin or composite material 830 to cover the leg members to form the insulating spacer 850 of the present invention.

Material 830 can be synthetic resin material such as polyvinyl chloride resins, polycarbonate resins or other suitable synthetic resins, or composites thereof including those of glass fibers or beads, for example. In the preferred embodiments, a composite of polyvinyl chloride resins filled with glass fibers is used. It is most preferred to use such a composite in which twenty percent of the composite is glass fibers. For example, a composite, 902GR20, sold by the BF Goodrich Co. is suitable. This composite happens to contain high temperature resistant PVC's. However, composites of standard PVC's also can be used in this invention. It is preferred that the amount of glass fibers in the composite be within a range of ten to thirty percent. However, this range could be extended from zero to fifty percent, if necessary. Increasing the amount of glass fill provides a better coefficient of expansion, since it is closer to that of the glass.

However, one having ordinary skill in the art recognizes that other synthetic resin materials or composites providing the desired properties also can be used for the top bridge member and/or the bottom member, as in the case of the third embodiment. For example, polycarbonates such as those sold by the General Electric Co. under the trademarks of GELOY and LEXAN can be used. Other materials performing the same or similar functions are also considered to be within the scope of my invention.

When a spacer having a bottom bridge member being roll-formed from the same material as that of the first and second leg members is made, the roll-former 810 will roll the metal into a channel configuration of the first and second leg members and the bottom bridge member.

When a spacer having a top and bottom bridge member of the same synthetic resin or composite material is made, the same extruder 820 will be used to extrude the resin or composite material 830. The extrusion die will be set up in the fashion discussed above, but will have two ports to allow the same synthetic resin or composite material to pass through. When a spacer with top and bottom bridge members of different synthetic resin or composite materials is made, extruder 820 can be provided with two ports to receive the different materials.

The cooled final spacer product 850 exits the extruder 820 and can be shaved to the dimensions required by the customer, and cut to the desired length. This shaving process (not shown) allows manufacturing of spacers in a range of sizes from one die. For example, one die can produce a 0.500 inch spacer, and the shaving process can reduce that dimension to 0.469 or 0.437 inch, or less.

Other processes like ultrasonic welding, induction welding or bonding can be used to manufacture the insulating spacer of the present invention.

An ultrasonic welding process uses high frequency (e.g., above about 20,000 cycles/second) vibrations in the metal of the first and second leg members of the channel member. The metal is vibrated against the resin or composite material. The vibrations in the metal create friction which heats the resin or composite material to its melting point. Then, the first and second leg members of the channel member will embed into the resin or composite material.

In induction welding, electric current is induced to the metal of the first and second leg members of the channel member by a high radio frequency. This causes the metal to become very hot, sufficient to melt the resin or composite material thereto.

In a bonding process, previously extruded resin or composite material and treated metal of the first and second leg members of the channel member are joined together by an adhesive or other bonding agent.

The embodiments discussed above are representative of embodiments of the present invention and are provided for illustrative purposes only. They do not limit the scope of the present invention. Although certain dimensions and configurations have been shown and described, such are not limiting. Modifications and variations are contemplated within the scope of the present invention, which is intended to be limited only by the scope of the accompanying claims.

What is claimed is:

1. A method of making an enclosed, hollow insulating spacer for spacing apart panes of a multiple pane unit, said method comprising the steps of:

forming metal into first and second leg members for a spacer;

preheating the first and second leg members of the spacer near the melting point of one of a synthetic resin material and a composite synthetic resin material to prepare the metal leg members for being secured to the resin material in a crosshead extruder;

concurrently feeding the preheated first and second leg members of the spacer together with the one of the synthetic resin material and the composite synthetic resin material from respective feeds into a crosshead extruder, to embed, in a continuous crosshead extrusion process, only a portion of each of the first and second leg members into the resin material at respective ends of the leg members, to affix the embedded portion of each of the leg members to the material and to form from the material a first bridge member that extends between the respective ends of the leg members, spans across one end of each of the leg members and is spaced from the remaining portions, other than the affixed, embedded portions, of each of the leg members; and providing a second bridge member that connects the opposite ends of the first and second leg members, thereby defining (i) an enclosed channel portion of an insulating spacer, which has a hollow interior, and (ii) a periphery of the enclosed, hollow insulating spacer, by a configuration of the first bridge member, the first and second leg members and the second bridge member.

2. A method of making an insulating spacer according to claim 1, further comprising bending the first and second leg members of the metal channel into a zig-zag configuration.

3. A method of making an insulating spacer according to claim 1, further comprising roll-forming the second bridge member from the same metal as the first and second leg members.

4. A method of making an insulating spacer according to claim 2, further comprising extruding in the crosshead extruder the second bridge member from one of a synthetic resin material and a composite synthetic resin material.

5. A method of making an insulating spacer according to claim 2, further comprising extruding in the crosshead extruder the second bridge member from the same material as that of the first bridge member.

6. A method of making an insulting spacer according to claim 1, further comprising roll-forming the second bridge member from the same metal as the first and second leg members.

7. A method of making an insulating spacer according to claim 1, further comprising extruding in the crosshead extruder the second bridge member from one of a synthetic resin material and a composite synthetic resin material.

8. A method of making an insulating spacer according to claim 1, further comprising extruding in the crosshead extruder the second bridge member from the same material as that of the first bridge member.

9. A method of making an insulating spacer according to claim 1, wherein the metal is selected from steel, aluminum and combinations thereof.

10. A method according to claim 1, in which an upper portion of the configuration consists essentially of the first bridge member, and the rest of the configuration comprises the first and second leg members and the second bridge member.

\* \* \* \* \*

UNITED STATES PATENT AND TRADEMARK OFFICE
CERTIFICATE OF CORRECTION

PATENT NO. : 5,890,289
DATED : April 6, 1999
INVENTOR(S) : GUY GUILLEMET

It is certified that error appears in the above-indentified patent and that said Letters Patent is hereby corrected as shown below:

COLUMN 7

Line 47, "embodiment,of" should read --embodiment of--.

COLUMN 12

Line 4, "firsthand" should read --first and--.

COLUMN 14

Line 40, "claim 1," should read --claim 2,--.

Signed and Sealed this

Twenty-third Day of November, 1999

Attest:

Q. TODD DICKINSON

*Attesting Officer*      *Acting Commissioner of Patents and Trademarks*